United States Patent [19]
Schwab

[11] Patent Number: 5,279,646
[45] Date of Patent: Jan. 18, 1994

[54] VENTURI SCRUBBER AND PROCESS

[75] Inventor: James J. Schwab, Napa, Calif.

[73] Assignee: Process and Control Technology Corporation, Merrillville, Ind.

[21] Appl. No.: 904,208

[22] Filed: Jun. 25, 1992

[51] Int. Cl.$^5$ .............................................. B01F 3/04
[52] U.S. Cl. ................................. 95/201; 95/203; 95/224; 95/237; 55/257.6; 261/DIG. 54; 261/116; 261/22; 261/23.1
[58] Field of Search .................. 55/84, 94, 257.6; 261/DIG. 54, 116, 22, 23.1

[56] References Cited

U.S. PATENT DOCUMENTS

| | | | |
|---|---|---|---|
| 1,866,443 | 7/1932 | Zumbro | 55/257.6 |
| 2,579,282 | 12/1951 | Vicard | 183/29 |
| 3,339,344 | 9/1967 | Pallinger | 261/DIG. 54 |
| 3,406,953 | 10/1968 | Moore | 261/79 |
| 3,592,630 | 7/1971 | Willett | 261/DIG. 54 |
| 3,767,176 | 10/1973 | Engalitcheff, Jr. et al. | 261/DIG. 54 |
| 3,834,129 | 9/1974 | Darlinger et al. | 261/DIG. 54 |
| 3,881,898 | 5/1975 | Darby et al. | 261/DIG. 54 |
| 4,141,701 | 2/1979 | Ewan et al. | 261/DIG. 54 |
| 4,238,461 | 12/1980 | Devries | 261/115 |
| 4,266,951 | 5/1981 | Calvert | 55/257.6 |
| 4,364,750 | 12/1982 | Koncz | 55/94 |
| 4,401,444 | 8/1983 | Teller | 261/DIG. 54 |
| 4,469,493 | 9/1984 | Tuovinen et al. | 261/DIG. 54 |
| 4,514,196 | 4/1985 | Herrlander | 261/DIG. 54 |
| 4,582,515 | 4/1986 | Eneroth et al. | 55/89 |
| 5,011,520 | 4/1991 | Carr et al. | 55/228 |
| 5,061,408 | 10/1991 | Hüning et al. | 261/112.1 |

OTHER PUBLICATIONS

Product Information Sheet, "Venturi Scrubbers Collect Ultrafine Particles and Mists" for Sly Manufacturing, publication date unknown.
Product Information Sheet, "Gas Cleaning Systems for Incineration Operations" for AirPol Technology, publication date unknown.
Project Manual for "Seneca Incineration Equipment Procurement", MWCC Project Number 855220, HDR Engineering, Inc.; Orr-Schelen-Mayeron & Assoc., Inc.; Tyson Associates; Twin City Testing; Carlson Associates; EMA, Inc., 1990, 3 sheets only.
Schifftner et al., "Wet Scrubber Dry End Product", *Pollution Engineeering*, Nov. 1989.
Martin Crawford, *Air Pollution Control Theory*, McGraw-Hill Book Company, New York, 1976.
Baturay et al., "Synopsis—The RHOX System", Aug. 1988.
Excerpt from Product Brochure "Spray Droplet Size (Atomization)" for Spraying System Co., publication date unknown.
Product Information Sheet, "*Impingement Baffle Plate Assures Thorough Scrubbing*", publication date unknown.

*Primary Examiner*—Tim Miles
*Attorney, Agent, or Firm*—McCubbrey, Bartels, Meyer & Ward

[57] ABSTRACT

A venturi scrubbing system optimized for removing the most optically active sized particles from a gaseous effluent stream is disclosed. Before entering the venturi the effluent stream is subcooled to cause condensation of water vapor and other condensibles, thereby greatly reducing the volume of the effluent stream. In the venturi stage a scrubbing liquid is added in the form of droplets having a median diameter which is optimized to remove the optically active particles. Preferably, the median diameter of the scrubbing liquid droplets is between 10 and 200 microns. A two-fluid nozzle may be used to efficiently form the droplets. After passing through the scrubbing stage, which may also comprise one or more impingement plates, the cleansed effluent may be passed through an afterburner to remove combustible materials such as organic vapors.

26 Claims, 7 Drawing Sheets

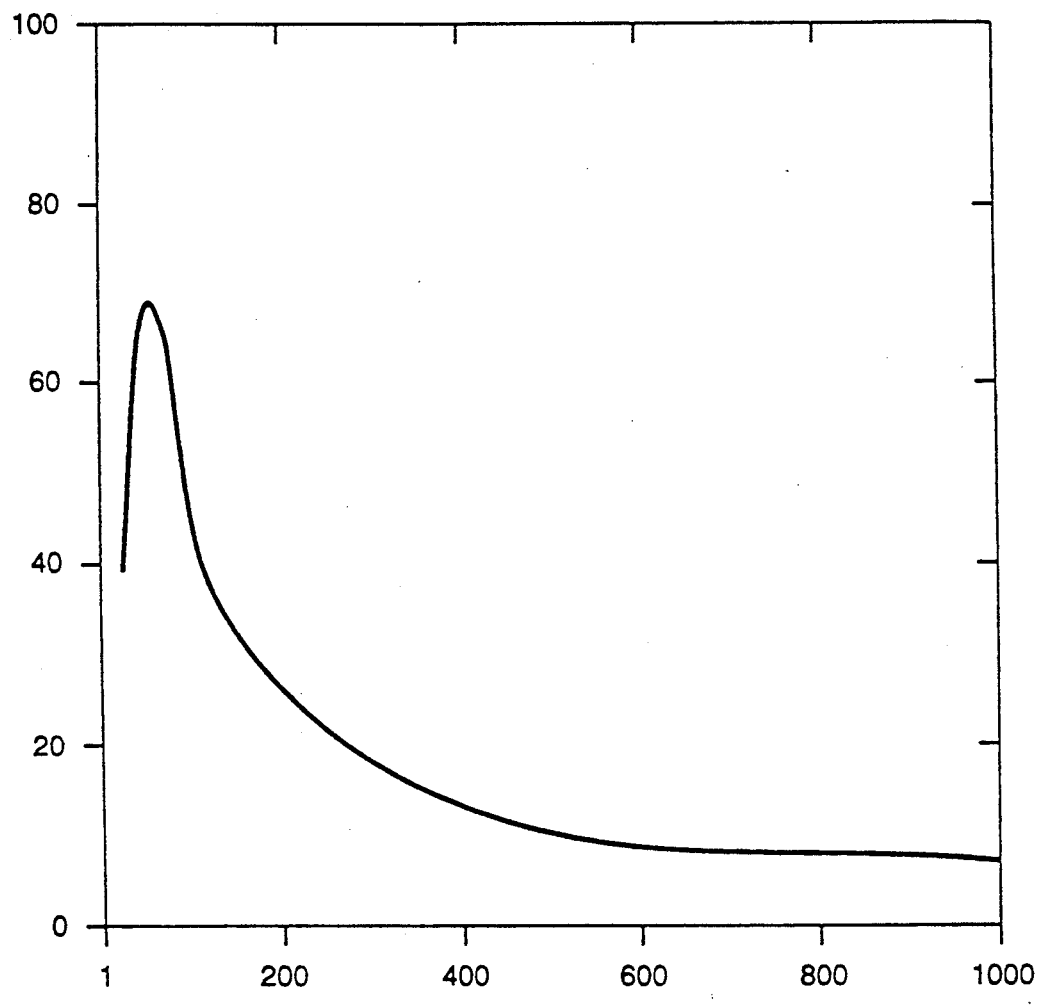
FIG._6A

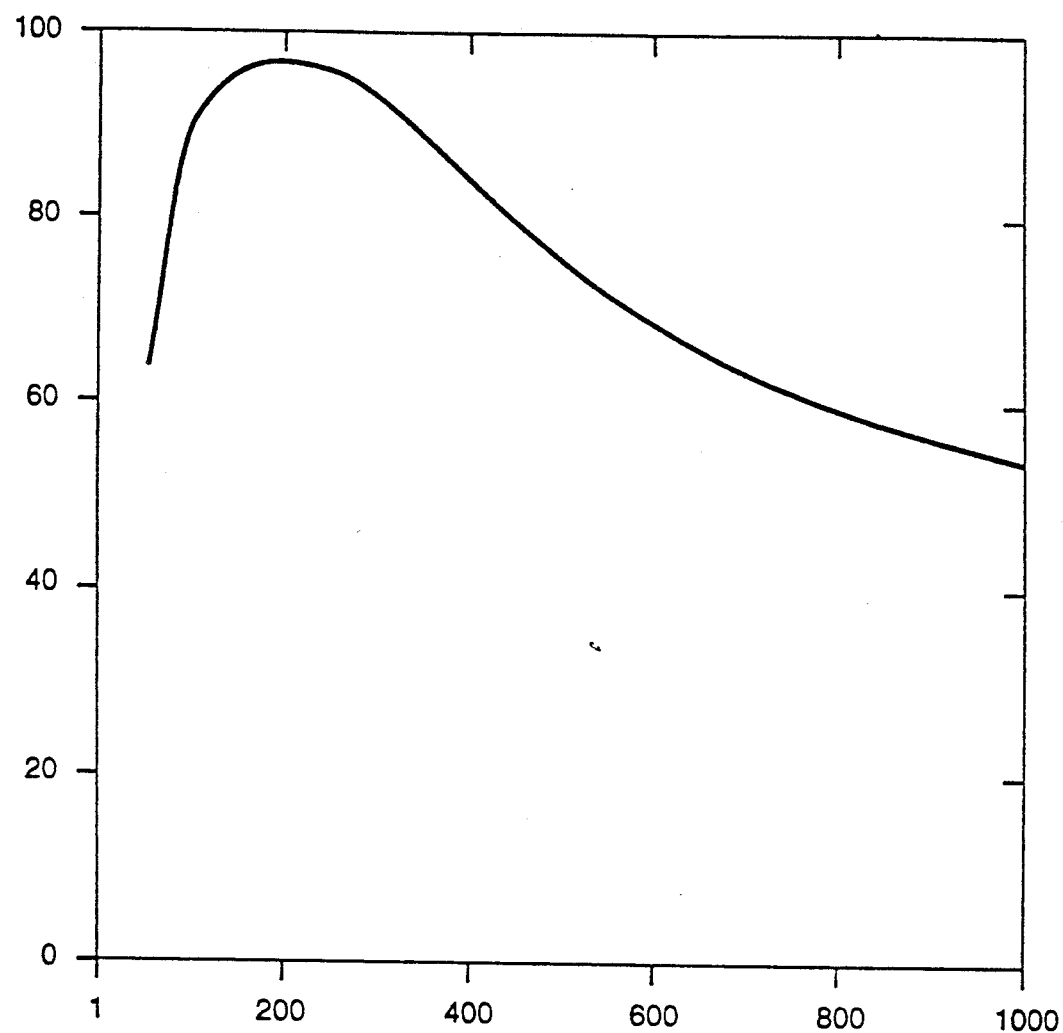
FIG._6B

VENTURI SCRUBBER AND PROCESS

FIELD OF THE INVENTION

This invention relates to the field of air pollution control, and is particularly directed to an improved venturi wet scrubbing system for removing contaminants from a gaseous effluent stream, such as the output of an incinerator.

BACKGROUND OF THE INVENTION

Over the past several decades the control of air pollution has become a priority concern of society. The United States, and other countries, have developed highly elaborate regulatory programs aimed at requiring factories, and other major sources of air pollution, to install the best available control technology (BACT) for removing contaminants from gaseous effluent streams released into the atmosphere. The standards for air pollution control are becoming increasingly stringent, so that there is a constant demand for ever more effective pollution control technologies. In addition, the operating costs of running pollution control equipment can be substantial, and so there is also a constant demand for more efficient technologies.

Concerns about pollution control are directed to more than air pollution, and removing contaminants from one medium frequently results in their introduction into another. For example, the treatment of municipal wastewater under the Clean Water Act has resulted in an enormous increase in the amount of sewage sludge that must be disposed of. Many communities lack adequate disposal sites to discard sludge that is generated by their municipal wastewater treatment plants in landfills, and are turning to incineration as an alternative method of disposal. Incineration of sludge, or other waste products, while greatly reducing the volume of material that must be disposed of on land, may result in the release of contaminants in the sludge into the atmosphere. In this regard, it is noted that the sludge generated by many municipalities is contaminated by highly toxic heavy metals and organic compounds, as well as acidic compounds such as chlorides and sulfates. The release of such compounds into the atmosphere is highly regulated, and sludge incineration systems are required to use BACT for controlling the release of contaminants into the atmosphere.

One well known type of device for removing contaminants from a gaseous effluent stream is a venturi scrubber. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. A scrubbing liquid in the form of droplets, typically of water, is added to the venturi, usually at the throat, and enters the gas flow. The water droplets used are generally many orders of magnitude larger than the contaminant particles to be collected and, as a consequence, accelerate at a different rate through the venturi. The differential acceleration causes interactions between the water droplets and the contaminant particles, such that the contaminant particles are collected by the water droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting highly soluble gaseous compounds by diffusion. A detailed description of these scrubbing mechanisms is discussed in Chapter 9 of *Air Pollution Control Theory*, M. Crawford, (McGraw-Hill 1976).

After the particulate contaminants are collected by the water droplets, the water droplets are then removed from the effluent stream which is thereby cleansed. Removal of the water droplets may be accomplished by a number of known means. The various removal methods rely on the fact that the water droplets are relatively large and, due to inertia, cannot change direction rapidly. For example, the gas flow may be directed toward a surface such as an impingement plate. While the gas moves around the surface, the inertia of the relatively large water droplets causes them to strike the surface where they are captured. Likewise, if the droplets are subjected to a circular flow, as in a cyclonic separator, the large droplets will collide with the wall of the separator due to centripetal force.

Most venturi scrubbers in use today are "self-atomizing", i.e., the droplets are formed by allowing a liquid to flow into the throat of the venturi where it is atomized by the gas flow. While very simple to implement, this method is not able to produce droplets of very small median diameter. Although not much utilized in commercial embodiments, it has previously been taught that the collection efficiency of a venturi scrubber is related to the size of the water droplets used in the scrubber. In particular, it has been taught that the collection efficiency increases as the surface area of the water droplets used in the scrubber, and it is well known that the surface area of a given quantity of liquid increases with decreasing droplet size. Thus, given this teaching, it would seem that the droplet size of the scrubbing liquid should be reduced to the minimum.

However, as recognized by the inventor hereof and as taught herein, there is a point at which a further decrease in the size of the droplets of the scrubbing liquid begins to become detrimental. As a practical matter, prior art venturi scrubbing devices, even those which claimed to utilize very fine droplets, actually utilize droplets which are much larger than is optimal according to the teachings hereof.

The primary methods heretofore utilized in improving the collection efficiency of a venturi scrubber has been to decrease the size of the throat or to increase the overall rate at which gas flows through the system. Both of these methods increase the differential velocities between the contaminant particles and liquid droplets as they pass through the throat of the venturi. This causes more interactions between particles and droplets to occur, thereby improving contaminant removal. However, increasing the collection efficiency in this manner comes at a cost of significantly higher energy input into the system, thereby resulting in higher operating costs. The extra energy is expended due either to the increased overall flow resistance attributable to the reduced throat diameter, or to the increased overall flow rate through the venturi. In either case, the pressure drop across the venturi is increased and greater pumping capacity is required. Accordingly, heretofore, efforts to increase the fine particle collection efficiency of a venturi scrubber have involved substantial increased energy input into the system.

Of particular concern to those in the field of air pollution control is the collection of "optically active" particles. As used herein, the term "optically active particles" should be understood to mean particles having a diameter in the range of approximately 0.1 to 1.0 microns. These particles are difficult to collect in conventional venturi scrubbers due to their small size. Nonetheless, particles in this size range often comprise toxic material the release of which is not permitted. Due to the relatively large surface area of optically active particles, they absorb a disproportionate amount of heavy metal contamination. As their name implies, optically active particles interact with light. Even if they do not contain toxic components, the emission of optically active particles is highly visible and undesirable from an aesthetic point of view. Particles which are larger in diameter than about 1.0 micron are also sometimes considered optically active. However, the present invention is not directly concerned with the collection of these larger particles and they have, therefore, not been included in the definition of the term optically active as used herein. It is considered that particles larger than 1.0 micron in diameter are relatively much easier to collect.

As noted above, municipal sewage sludge often contains significant amounts of toxic heavy metal and organic materials. Heretofore, scrubbers have not been efficient in removing these materials from the gaseous effluent of incinerated sludge. Municipal sewage sludge incineration typically requires the use of high temperatures (i.e., between 800°-1200° F.). At these elevated temperatures, the organic materials are vaporized and are, thus, not susceptible to efficient scrubbing. One approach to this problem has been to use an afterburner on the effluent stream, whereby the organic vapors are combusted and, thereby, transformed into non-toxic compounds, primarily water vapor and carbon dioxide. However, incomplete combustion of the organics can result in the production of carbon monoxide, soot, and/or gaseous hydrocarbons. If soot (i.e., fine particles of carbon) is produced, other compounds, such as those containing heavy metals, can be adsorbed on the surface of the carbon particles. Any particles that are formed in this way are likely to be difficult to collect due to their small diameter. And, as noted above, very small particles are efficient collectors of volatile heavy metals.

One approach to solving the problem of incomplete combustion in an afterburner involves placing the afterburner downstream of the scrubbing stage(s) rather than upstream as is traditional. This allows removal of particles prior to afterburning, and allows for more efficient afterburning. This prior art method also involves cooling the gaseous effluent between the venturi stage and the afterburner stage. Cooling causes the condensation of certain materials which are then removed in a second scrubber. While this approach is believed to be an improvement, it requires two scrubbing stages to collect the particulates in the effluent stream.

Accordingly, it is an object of the present invention to provide an improved venturi scrubber that is capable of increased particle collection without the need to increase the rate of gas flow through the system or to decrease the size of the venturi throat.

Another object of the present invention is to provide an improved venturi scrubber wherein the size of the droplets used to collect contaminant particles is optimized.

Another object of the present invention is to provide a venturi scrubber having a high collection efficiency without the need for a commensurate increase in the energy input to the system, as compared to the prior art.

Yet another object of the present invention is to provide a nozzle for use in a venturi scrubber which has the characteristics needed to efficiently generate droplets having an optimal size for collecting optically active contaminant particles.

A further object of the present invention is provide a contaminant removal system for use with a municipal sewage sludge incinerator that is efficient in removing toxic heavy metal and organic contaminants.

SUMMARY OF THE INVENTION

The foregoing objects of the present invention, and others that will be apparent to those skilled in the art after reading this specification in conjunction with the accompanying drawings and the appended claims, is realized by a novel air pollution control system. In its basic form, the present invention comprises a venturi scrubber having means for introducing droplets of a scrubbing liquid having a predetermined optimal median diameter. In the preferred embodiment, the optimal median diameter of the scrubbing liquid droplets is between 10 and 200 microns. This corresponds to being between about two and three orders of magnitude greater than the median diameter of the optically active particles in the effluent, or, more specifically, between about 100 to 500 times the diameter of such particles. A spray nozzle designed to form droplets of the desired diameter comprises means for flowing a mixture of the scrubbing liquid and a gas under pressure through an orifice. By controlling the respective pressures at which the liquid and the gas are delivered to the nozzle, both the rate and the size of droplet production can be adjusted. In another aspect of the present invention, the effluent entering the venturi scrubber is precooled, preferably to a temperature below 120° F., to cause formation of collectable particles of condensible materials in the effluent flow. Optionally, an afterburner may be added downstream of the venturi to cause combustion of any organic vapors remaining in the effluent flow after scrubbing.

BRIEF DESCRIPTION OF THE DRAWINGS

FIGS. 6A and 6B are graphs showing the calculated relationship between median spray droplet size and collection efficiency of 0.1 and 1.0 micron contaminant particles, respectively.

DETAILED DESCRIPTION

Figure 1:
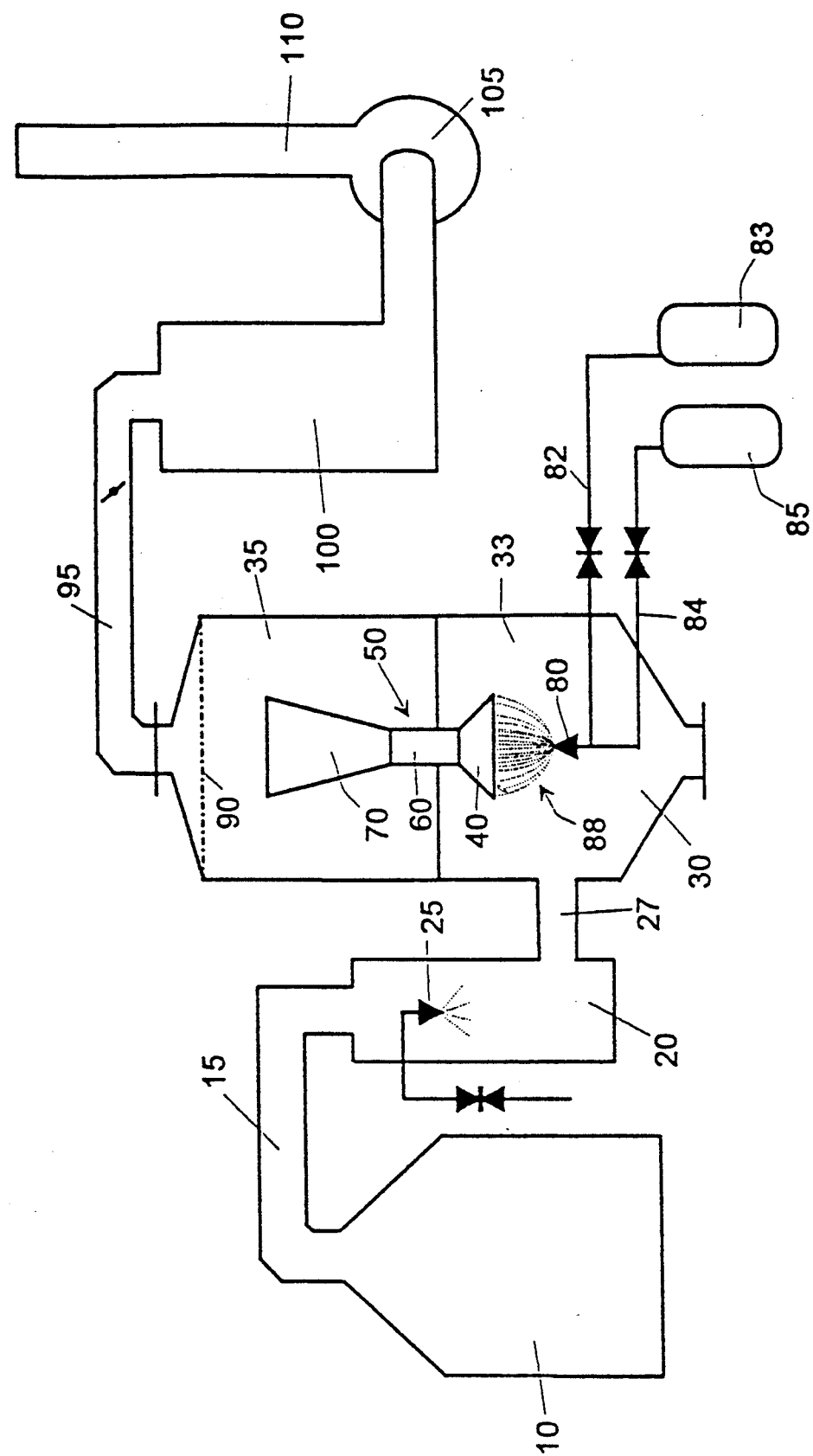
FIG. 1 is a partially schematic cross-sectional view of a air pollution control system according to the present invention.

Turning first to FIG. 1, an overall air pollution control system 1 of the present invention is shown. A contaminant laden gaseous effluent stream is generated by incinerator 10, for example a multiple hearth furnace used to incinerate sludge generated by a municipal wastewater treatment facility. As used herein, the term "gaseous effluent" is intended to include effluent streams that have liquid or solid particulate material entrained therein, including vapors which may condense as the effluent stream is cooled. While the present invention is described, for exemplary purposes, in conjunction with an incinerator, incinerator 10 is not considered to be a part of the present invention. The air pollution control system 1 of the present invention will be equally useful in conjunction with other sources of contaminated gaseous effluent. It should be noted that many sources of air pollution involve what is, at least initially, a very hot effluent stream created as a result of a combustion process.

Incinerator 10 produces a high volume of contaminated gases at a temperature which may be as hot as 1200° F. These gases leave incinerator 10 via duct 15 and flow into precooling chamber 20. In precooling chamber 20 the gases are cooled to a much lower temperature, preferably below about 120° F. Many methods of cooling a hot effluent gas flow are know to those skilled in the art and may be used in connection with the present invention. One method, depicted schematically in FIG. 1, involves spraying a cooling liquid, such as water, into the gas through nozzle 25. Cooling the effluent causes condensible vapors in the effluent stream to undergo a phase transition. While water will usually be the primary condensible compound present in the effluent stream, other condensible compounds of greater concern, such as acid gases and organic materials, are also often present in quantities of concern. Condensation of these vapors will naturally occur around particles in the effluent stream which serve as nucleation points. Precooling the effluent stream is, thus, useful for two reasons. First, condensible contaminants are transformed to the liquid phase and are thereby more easily removed from the effluent. Second, the nucleation process increases the size of preexisting particles in the effluent, thereby making it easier to remove them. In addition, removal of water vapor from the effluent stream can result in a substantial reduction in the volume of gaseous effluent that must be processed. Precooling of an effluent stream to cause condensation is sometimes also referred to as subcooling. It is estimated that, in some instances, subcooling will reduce the overall volume of the effluent stream by more than fifty percent.

After flowing through precooling chamber 20, the cooled effluent exits via duct 27 and enters venturi scrubbing chamber 30, comprising lower and upper portions 33 and 35, respectively. Venturi scrubbing chamber 30 is shown in greater detail in FIG. 2. The particulate laden gas stream enters lower chamber 33, within which is located entrance or inlet cone 40 of venturi 50. Venturi 50 also includes a throat portion 60, and an outlet or discharge cone portion 70, which are conventional. A two-fluid nozzle 80 forms a spray of scrubbing liquid having droplets which are optimized for maximum collection of optically active particles. A discussion of the operation of nozzle 80, and of the formation of droplets having an optimal median diameter, is set forth below.

Preferably, inlet cone 40 has a greater included angle than is typically used in venturi scrubbers. Preferably, the included angle of the inlet cone is between 45° and 90°, whereas prior art venturi scrubbers generally are in the range of 30°-45°. The relatively larger included angle comes at some cost in the energy required to move gas through the venturi, but improves scrubbing efficiency by maximizing the differential velocity between the contaminant particles and the scrubbing droplets.

Figure 4:
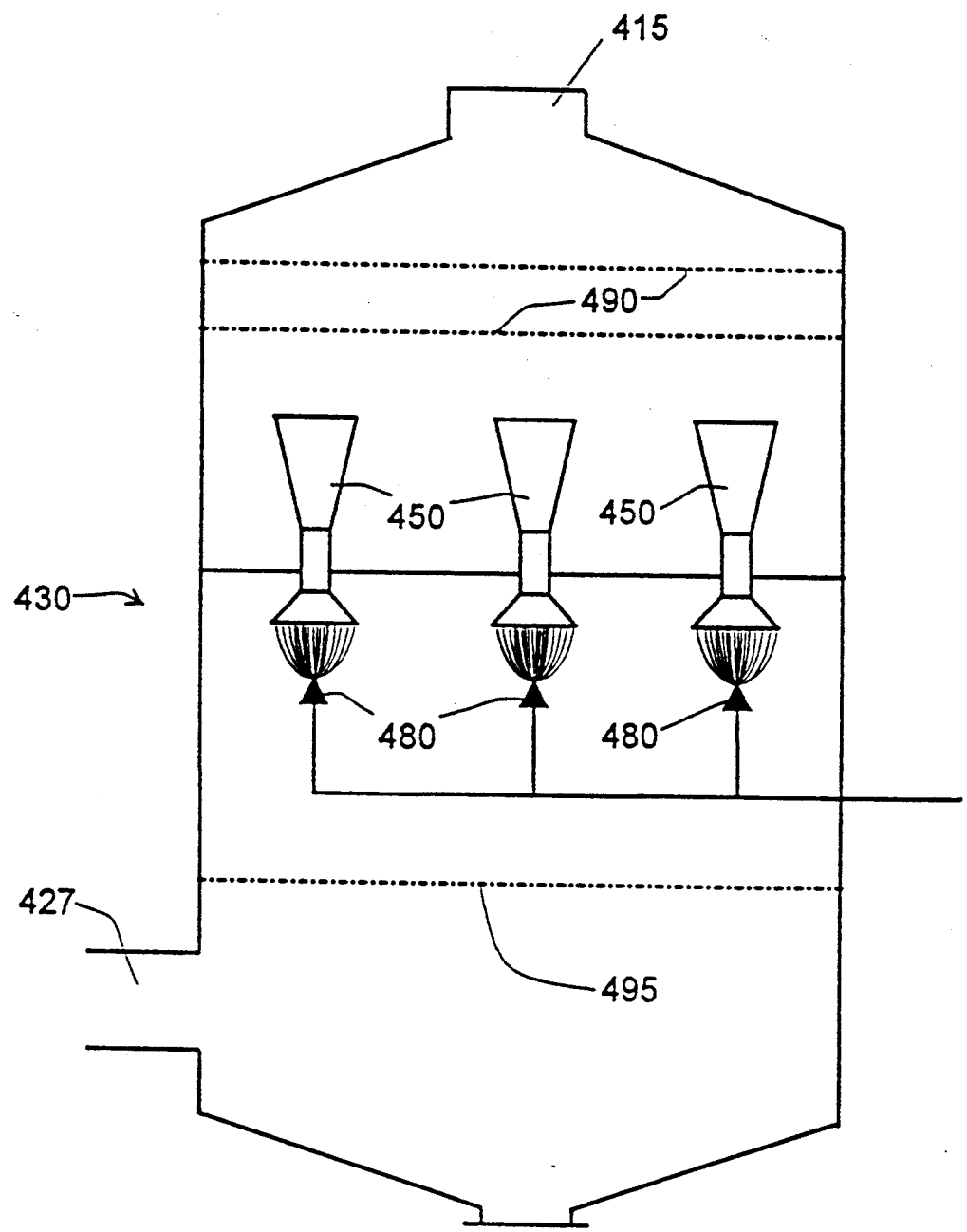
FIG. 4 is a partially schematic cross-sectional view of still another embodiment of the venturi scrubber of the present invention.

Effluent in venturi chamber 30 passes through venturi 50, where the spray droplets remove contaminant particles in the manner previously described. In one embodiment of the present invention the throat velocity of the effluent gas is 200-450 feet per second, and the scrubbing liquid is introduced at a rate of 1-5 gallons per 1000 actual cubic feet per minute (acfm) of effluent passing through the venturi. Preferably, the scrubbing liquid is uniformly introduced across the entire venturi input 40. After leaving venturi 50, the contaminant laden spray droplets are removed from the effluent stream by impingement plate 90. If desired, more than one impingement plate may be utilized. In an alternate embodiment, as impingement stage is placed prior to the venturi as shown in FIG. 4. Use of an impingement plate upstream of the venturi serves to further precool the effluent flow, to remove large particles and abrasives from the effluent stream and for absorption of gaseous compounds.

The cleansed effluent stream then exits venturi chamber 30 via duct 95 and flows to afterburner 100 where any remaining organic gases in the effluent stream are burned. Afterburner 100 must raise the temperature of the effluent gas to a suitably high temperature, and the gases must be held at this temperature in the presence of sufficient oxygen for a sufficient time to cause complete combustion. The optimal parameters for temperature, residence time and oxygen level will often involve engineering tradeoffs and will depend on the specific application. The use of an afterburner to burn organic materials in an effluent stream is well known, although normally the afterburner is positioned upstream of the scrubber. Although the gases entering afterburner 100 of the present invention are much cooler than if the afterburner were placed downstream of scrubber 30, the removal of condensible vapors from the effluent, particularly the removal of the very large volume of water vapor, offsets the energy required to reheat the effluent to combustion temperature.

After leaving afterburner 100, the effluent gas stream may be discharged into the atmosphere via stack 110, or may undergo further processing such as heat extraction. Gas flow through the entire pollution control system is propelled by induced draft fan 105.

Figure 2:
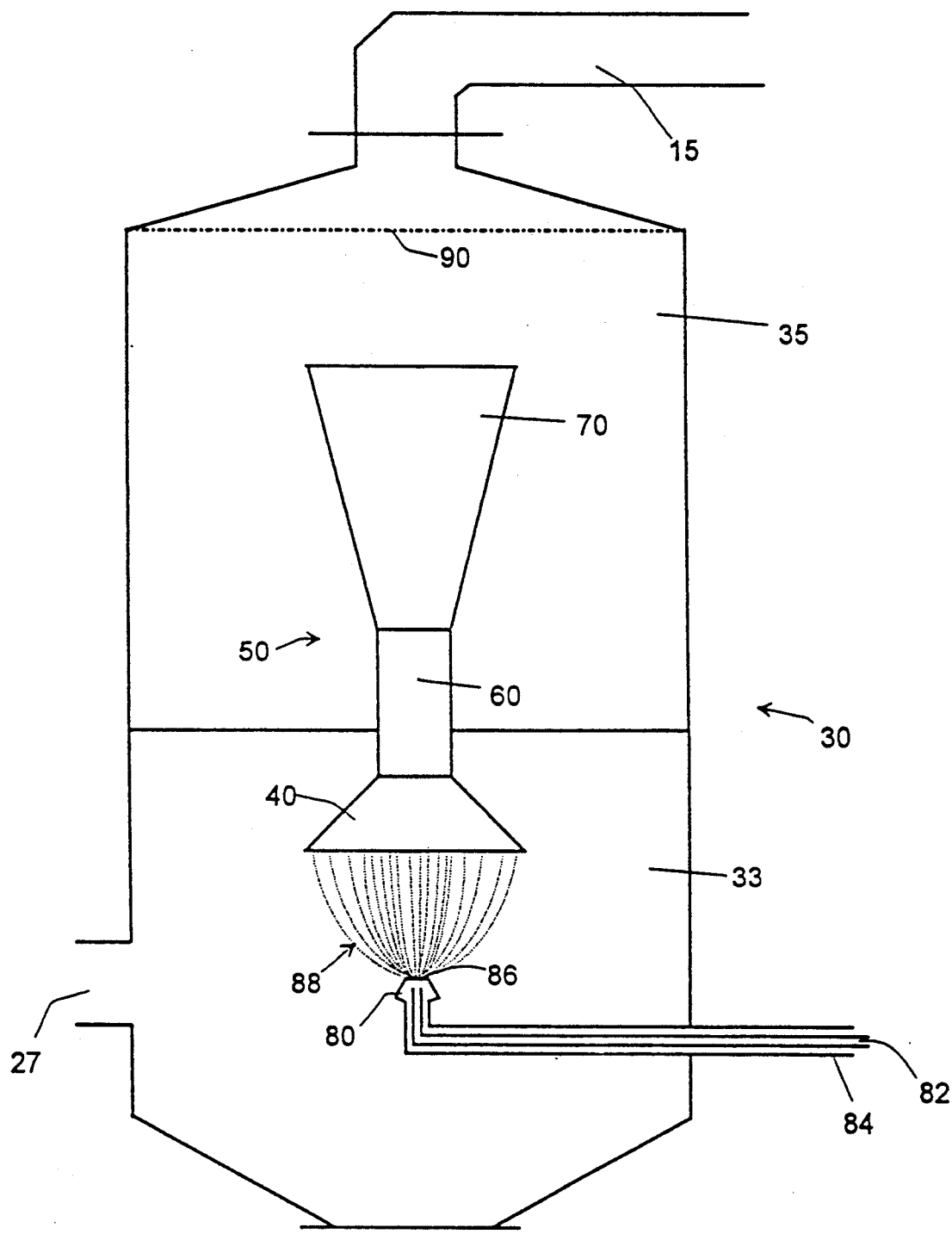
FIG. 2 is a partially schematic cross-sectional view of one embodiment of a venturi scrubber of the present invention.

As noted above, the present invention uses a two fluid nozzle 80 to form spray droplets having a median diameter which is optimized to collect optically active particulates in the effluent stream. Nozzle 80 is fed by a source of pressurized scrubbing liquid 83, which is conveyed to the nozzle via feed tube 82, and a source of pressurized gas 85, which is conveyed to nozzle 80 via feed tube 84. In many applications, air and water are used as the gas and liquid, respectively, for convenience and to minimize operating costs. The water used in the system may be recycled as is shown schematically in FIG. 3. Although FIG. 2 shows liquid feed tube 82 residing within and concentric with gas feed tube 84, it will be apparent to those skilled in the art that other arrangements are possible and may, in fact, be preferred. The two fluids mix just before an orifice 86 forming a spray 88 as they leave orifice 86 under pressure. A two fluid nozzle of the type which is used in the present invention is commercially available from Delavan, Inc., of Lexington, Tenn.

A variety of measures are used to characterize the diameter of the droplets in a spray. As used herein the term median diameter is intended to refer to what is more precisely termed the median volume diameter (MVD), sometimes referred to as the volume median diameter (VMD). The median volume diameter is the droplet size such that fifty percent of the total volume of liquid sprayed is made up of droplets having a diameter larger than the median value and fifty percent of the total volume of liquid sprayed is made up of droplets having a diameter smaller than the median value. Preferably, the droplet distribution is uniform about the median value such that most of the volume of liquid sprayed is in the form of droplets having diameters close to the median value.

By controlling the flow and pressure of the gas and liquid entering nozzle 80, it is possible to independently control both the size of the droplets and the quantity of scrubbing liquid injected into the venturi. In particular, increasing the air pressure to the nozzle tends to decrease the size of the droplets produced, while increasing the water pressure increases the quantity of spray formed. Preferably, the droplets should have a median diameter the range of about 10 to 200 microns. Droplets in this size range are between about two to three orders of magnitude greater in diameter than optically active particles in the effluent stream. More particularly, they are about 100 to 500 times the diameter of the optically active particles in the effluent. The ability to independently adjust the characteristics of the spray may be useful where the characteristics of the effluent stream are variable. Thus, if the number or size of the optically active particles in the gas flow changes, the spray characteristics can be adjusted accordingly.

It is very difficult to obtain droplets of the preferred size without using a two-fluid nozzle. As noted above, most prior art venturi scrubbers rely on self-atomization, using energy from the fan to atomize the scrubbing liquid. Such systems do not rely on a nozzle to form droplets, but rather, introduce the scrubbing liquid directly into the throat of the venturi where it is atomized by the accelerating gas flow around it. Some prior art venturi scrubbers employ single fluid liquid nozzles to introduce a spray of scrubbing liquid into the venturi. It is very difficult to produce droplets in the preferred size range using a single fluid nozzle. One would have to resort extremely high nozzle pressure to obtain the desired degree of atomization and, even at high pressures, commercially available nozzles do not have the capacity to provide a large volume of liquid into the gas flow. There is no indication that any of the prior art devices known to the inventor is operated at the required pressure levels. For example, to produce droplets of the proper size, it is believed that a commercially available "fine spray" single fluid hydraulic nozzle from Spraying Systems Co. would have to be operated at over 800 psig liquid pressure, and, at that level would only deliver less than two gallons of liquid per minute to the venturi. Thus, while some prior art devices use liquid nozzles to form droplets, it is believed that prior art venturi scrubbers have not used droplets smaller than about 500–1000 microns in diameter.

Spray from nozzle 80 is introduced near the venturi inlet in a low velocity section of the precooled effluent gas flow. Preferably, the spray is uniformly distributed over the entire inlet cone 40. As the gases, spray droplets, and contaminant particles are accelerated in the throat of the venturi, the differential velocity between the particles and droplets is maximized.

Certain teachings of the prior art suggest that the droplets used in a venturi scrubber should be as fine as possible. This teaching is unqualified and unquantified, and proceeds from the simplistic view that the sole concern in scrubbing efficiency is the overall surface area of the scrubbing liquid droplets. Nonetheless, it is clear from the same teachings that the droplets being used are, in fact, much larger than those preferred in the present invention. As explained below, there is a lower limit to the preferred droplet size. Droplets which are much finer than this lower limit are less efficient in collecting contaminant particles.

The ability to optimize droplet size for maximum collection efficiency has been verified experimentally and has a theoretical explanation. For example, in one experiment, the inventor investigated the scrubbing efficiency of a spray having droplets roughly equal in size to the optically active particles in an effluent stream. This experiment determined that such a spray was relatively inefficient in scrubbing the effluent stream, contrary to the prior art teaching that finer droplets improved scrubbing efficiency.

The apparent theoretical explanation for this result is as follows. Venturi scrubbing relies on the differential velocity between scrubbing droplets and contaminant particles. The gaseous effluent and the spray droplets both enter the inlet cone of the venturi at relatively low velocities. Differential velocities are achieved primarily as the particles and droplets undergo acceleration through the throat of the venturi. Normally, the contaminant particulates, being much smaller and having much less mass, rapidly accelerate to attain the velocity of the surrounding gas in a very short distance. On the other hand, the scrubbing liquid droplets are normally much larger and more massive, so that it takes them much longer to attain the velocity of the gas stream. Typically, these droplets will not reach this ultimate velocity until the end of the throat or just beyond the end of the throat.

Since it is the velocity differential which causes scrubbing, once the droplets and particles reach the same velocity the number of interactions between the two will reduced to the point of insignificance, and no further scrubbing will occur. When the droplets start out being roughly the same size as the contaminant particles, they accelerate at roughly the same rate as each other, and no substantial velocity difference is realized as they pass through the venturi. Thus, if the spray droplets are too fine, i.e., of the same order as the contaminant particles, scrubbing efficiency will be degraded.

Thus, the prior art teaching, that "finer is better", is good only to a point, after which any further reduction in droplet size actually degrades scrubbing efficiency. FIG. 6A shows the calculated relationship between collection efficiency (shown as percentage on the vertical axis) and scrubbing liquid droplet size (in microns on the horizontal axis) for contaminant particles having a diameter of 0.1 micron. It is seen that the optimal droplet size is approximately 50 microns, and that collection efficiency falls off rapidly when the droplets are either smaller or larger than this optimal size. FIG. 6B shows the calculated relationship between collection efficiency and scrubbing liquid droplet size for contaminant particles having a diameter of 1.0 micron, just beyond the range of optically active particles. In this instance, the optimal droplet size is almost 200 microns. While in this case the fall off in collection efficiency for droplets which are not optimal is not as dramatic as it is with the smaller 0.1 micron particles, it is still quite significant.

According to the present invention, it is possible to obtain spray droplets of any predetermined median diameter, so that scrubbing efficiency is enhanced. In the prior art, the primary method used to increase scrubbing efficiency has been to increase the gas flow rate through the venturi, either by narrowing the throat or by increasing the overall flow rate of gas through the system. In either case, significantly more energy is required due to the need for more powerful fans, thereby raising the operating costs for the system. The present invention requires only slightly more energy to operate the nozzle than a prior art system, but the increase in scrubbing efficiency obtained per added unit of energy input is far greater than can be obtained by the prior art methods of increasing efficiency. Thus, the present invention is a highly cost effective way to improve scrubbing efficiency. For example, it is estimated that a typically prior art design utilizing self-atomization would require a pressure drop across the venturi of 55 inches of water to achieve an overall collection efficiency of 99.3%. This, in turn would require the use of 15.4 horsepower per 1000 acfm. On the other hand, the venturi of the present invention can achieve a collection efficiency of 99.4% with a pressure drop across the venturi of only 16 inches of water, and requiring only 6.3 hp/acfm.

Figure 3:
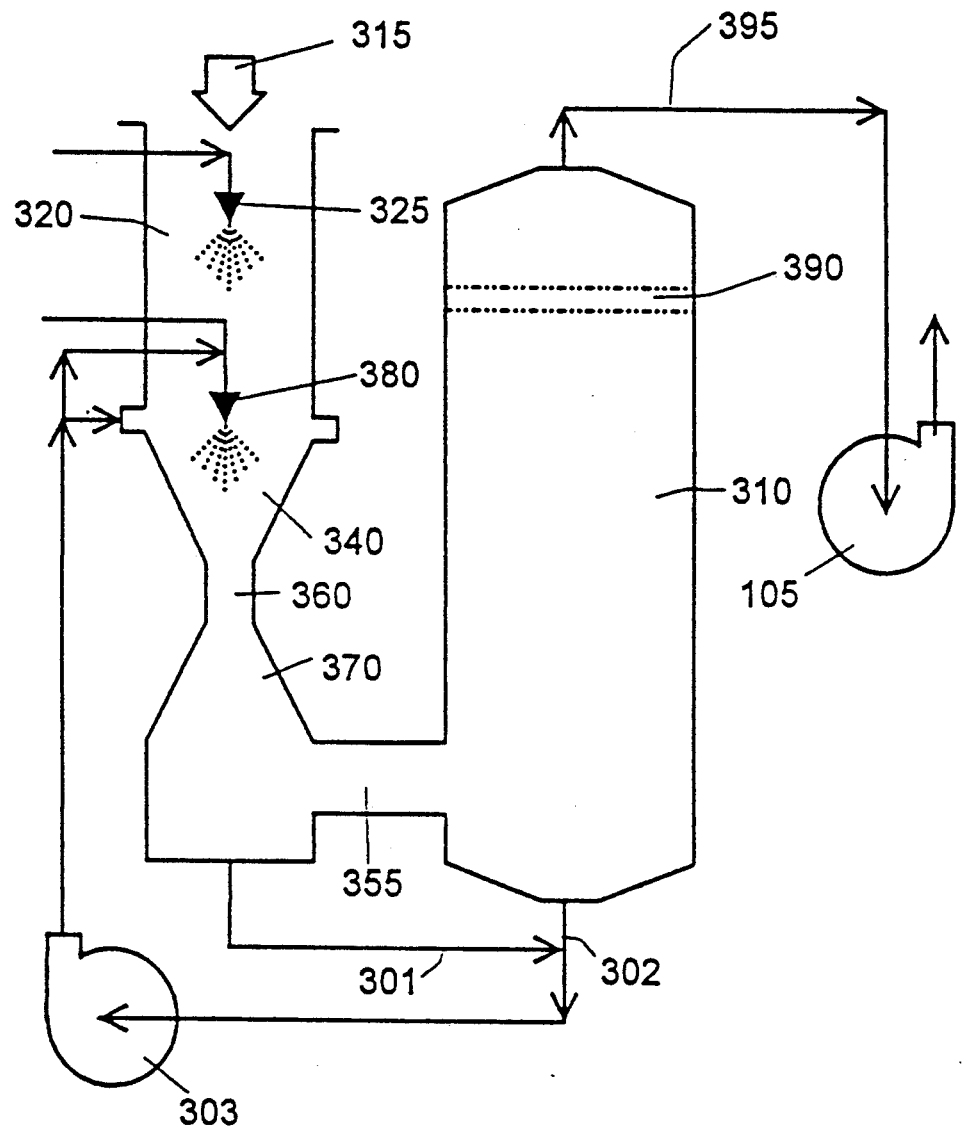
FIG. 3 is a partially schematic cross-sectional view of another embodiment of the venturi scrubber of the present invention.

An alternate embodiment of the present invention is shown in FIG. 3, wherein the same numbers are used to identify the same parts shown in FIGS. 1 and 2. In the embodiment of FIG. 3, the precooling chamber 320 is stacked directly on venturi 350. Again, cooling may be accomplished by using a first spray nozzle 325 to reduce the heated effluent entering chamber 320 as shown by arrow 315. Two-fluid nozzle 380 is used to introduce droplets of a scrubbing liquid having a predetermined diameter. Unlike the venturi of the FIGS. 1 and 2 embodiment, the venturi of the FIG. 3 embodiment is not contained within a chamber, but rather, is free standing. After leaving the discharge cone of the venturi, the effluent gas flows into cyclonic separator 310, wherein the contaminant laden droplets are removed from the gas flow. Use of cyclonic separation to remove droplets is well known and need not be described in detail. In addition, an impingement plate 390 may also be used, if needed, to remove remaining droplets that are not removed by cyclonic separation.

As is shown schematically in FIG. 3, the liquid used for scrubbing can be recycled to further reduce the operating cost of the system. The scrubbing liquid can be collected form the bottom of the venturi via line 301. Likewise, liquid can be collected from the bottom of cyclonic separator 310 via line 302. Pump 303 is then used to recycle the recovered liquid, which may first be filtered by conventional means (not shown).

Yet another embodiment of the present invention is shown in FIG. 4 wherein a plurality of venturis 450 are housed in a venturi chamber 430. Each of the venturis of the FIG. 4 embodiment are substantially the same, and are of similar design to the venturis shown in FIGS. 1 and 2. Nozzles 480 provide a spray of scrubbing liquid with droplets having a preselected optimal median diameter as described above. Preferably, the nozzles are two-fluid nozzles. The advantage of using multiple venturis is that is permits a more compact overall design and reduces the size of the individual nozzles.

The embodiment of FIG. 4 also shows the use of multiple impingement plates. Two impingement stages 490 are located downstream of the venturis 450, and one impingement stage 495 is located upstream of the venturis. The use of multiple impingement plates is useful in collecting larger sized particles in addition to contaminant laden droplets from the venturi. For the reasons described above, scrubbing efficiency of the venturi is low in respect to particles which are roughly the same size as the droplets used for scrubbing, although larger particles are relatively easy to collect using other means.

The venturi designs of FIGS. 1, 2, and 4 are particularly well suited to retrofit existing pollution control equipment to improve scrubbing efficiency and lower operating costs. A typical existing system will include a venturi stage immediately after the incinerator (e.g., a multiple hearth furnace). This venturi stage feeds a second scrubber stage such as an impingement scrubber or cyclonic separator. In the case of venturi scrubber, the existing venturi may be replaced by a straight duct section, which serves as the precooling chamber, placed ahead of the venturi scrubber of the present invention. The induced draft fan is replaced or slowed to produce the desired pressure drop across the venturi of the present invention while saving substantial energy. To retrofit an existing low energy impingement scrubber, one or more venturis of the present invention may be housed in the impingement chamber after removing one of the impingement plates.

Figure 5:
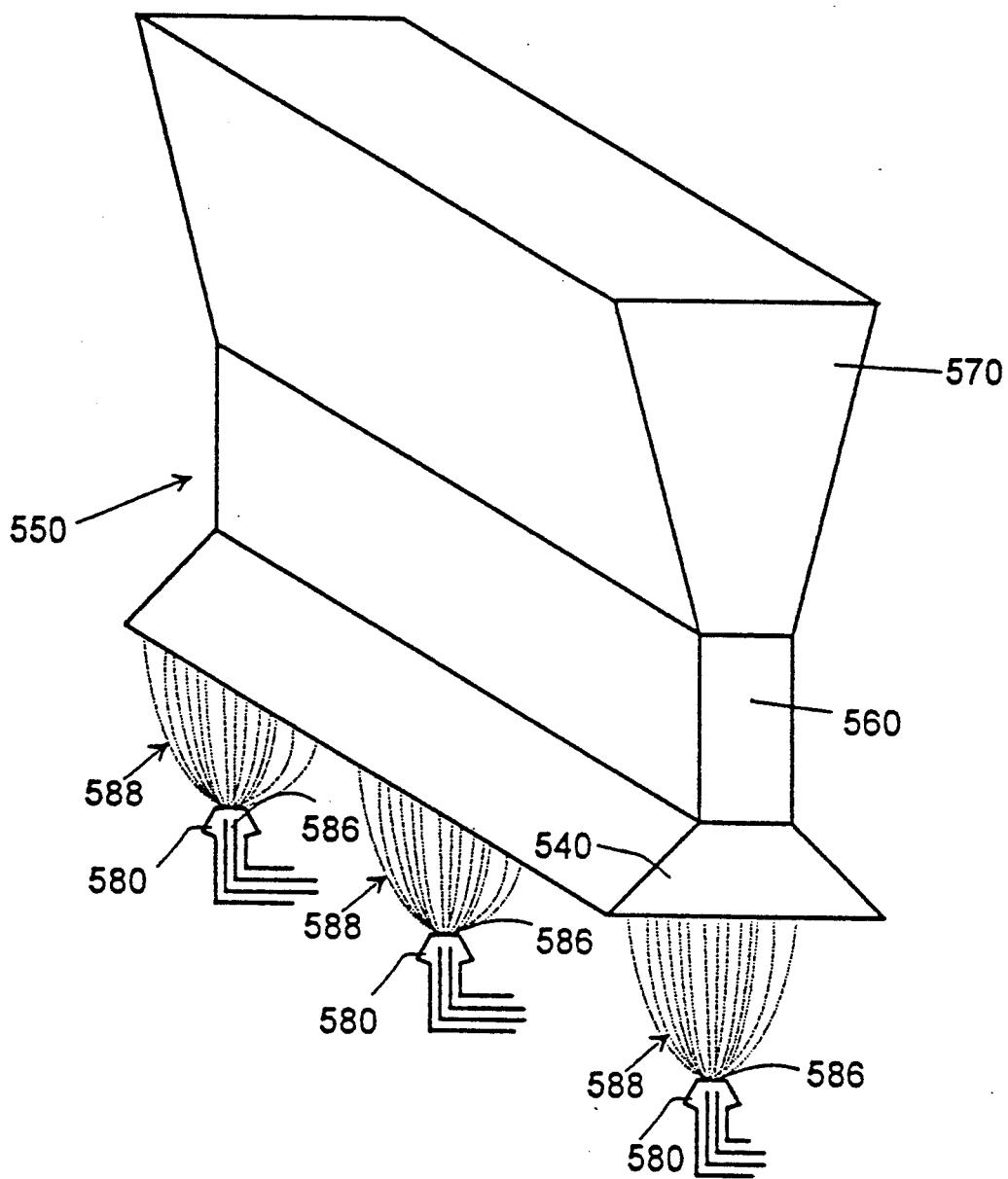
FIG. 5 is a partially schematic isometric view of yet another embodiment of the venturi of the present invention.

FIG. 5 is a partially schematic perspective view of yet another embodiment of the present invention wherein venturi 550 has an elongate shape and multiple nozzle 580 are used to inject a spray of droplets 588 into the effluent gas flow. Although for clarity three nozzles are shown, the number of nozzles used should be adequate to insure that the entire inlet 540 to venturi 550 is uniformly sprayed. Otherwise, there may be regions of gas flow that are not adequately scrubbed due to a reduced population of droplets. Preferably, each of nozzles 580 is of the two-fluid variety described above.

While the present invention has been described in conjunction with preferred embodiments thereof, it will be apparent to those skilled in the art that there are many variations and equivalents of that which has been described. For example, while the present invention has been described so as to optimize the collection of optically active particles, in certain applications it may be desired to increase the collection efficiency of particles within a different size range. Accordingly, it is intended that the invention should be limited only by the following claims.

What is claimed is:

1. A venturi scrubber, comprising:
venturi inlet means for introducing a flow of a contaminated gas containing particles into said venturi;

venturi throat means for causing said contaminated gas flow to accelerate as it passes through said throat means, said venturi throat means having a reduced diameter relative to said venturi inlet means;

means for causing said contaminated gas to flow through said venturi; and, nozzle means, positioned upstream of said throat portion, for introducing a spray of liquid droplets into said contaminated gas flow at a rate comprising at least one gallon per minute per 1,000 actual cubic feet per minute of said gas, and velocity which is approximately the same as the velocity of the particles in said contaminated gas flow upstream of said venturi throat, said droplets having a median volume diameter in the range of 10 to 200 microns.

2. The venturi scrubber of claim 1 further comprising an impingement surface downstream of said throat portion to intercept said liquid droplets in said gas flow.

3. The venturi scrubber of claim 1 wherein the median volume diameter of said liquid droplets is between 100 to 500 times greater than the median diameter of the optically active particles in the contaminated gas flow entering said venturi scrubber.

4. The venturi scrubber of claim 1 wherein there are a plurality of nozzles.

5. The venturi scrubber of claim 1 wherein said nozzle comprises means for flowing a mixture of said liquid and a gas under pressure through an orifice such that said liquid is atomized prior to being introduced into said contaminated gas flow.

6. The venturi scrubber of claim 5 further comprising means for independently adjusting the gas flow to said nozzle and the liquid flow to said nozzle so that the total volume of liquid and median diameter of liquid droplets sprayed into said contaminated gas flow may be independently varied.

7. The venturi scrubber of claim 1 further comprising means for precooling the contaminated gas flow before said contaminated gas flow reaches the region where said liquid spray is introduced.

8. The venturi scrubber of claim 7 wherein said contaminated gas flow includes water vapor and wherein said contaminated gas flow is precooled to a temperature at which substantial condensation of said water vapor occurs.

9. The venturi scrubber of claim 7 wherein said precooling means is adapted to reduce the temperature of said contaminated gas flow to a temperature less than about 120° F.

10. The venturi scrubber of claim 7 wherein said means for precooling the contaminated gas flow includes an impingement plate.

11. An air pollution control system for removing contaminants from a flow of high temperature gas, comprising:

a precooling stage for reducing the temperature of a flow of contaminated gas introduced at an input port thereof, such that at least some of the condensible contaminants within said gas flow are changed from a vaporized state to a particle state within said precooling stage, at least some of said particles being optically active;

a venturi stage having an input end in communication with the output of said precooling stage, said venturi stage comprising at least one throat portion and at least one nozzle for creating a spray of liquid droplets upstream of said throat portion and introducing said spray of liquid droplets into said contaminated gas flow at a velocity which is approximately the same as the velocity of the particles in said contaminated gas flow upstream of said venturi throat and at a flow rate of at least one gallon per minute per 1,000 actual cubic feet per minute of gas the volume median diameter of said liquid droplets created by said nozzle being in the range of 10 to 200 micron; and fan means causing said gas to flow through said air pollution control system.

12. The air pollution control system of claim 11 further comprising afterburner means downstream of said venturi stage such that volatile vapors remaining in said gas flow will be combusted.

13. The air pollution control system of claim 11 wherein said precooling stage is adapted to reduce the temperature of said contaminated gas entering said venturi stage to a temperature which is less than about 120° F.

14. The air pollution control system of claim 11 wherein said contaminated gas flow includes water vapor and wherein said contaminated gas flow is precooled to a temperature at which substantial condensation of said water vapor occurs.

15. The air pollution control system of claim 11 wherein said cooling stage comprises an impingement plate.

16. The air pollution control system of claim 11 wherein said venturi stage comprises a plurality of individual venturis mounted on a plate and a plurality of nozzles, each nozzle being positioned upstream and near the input end of an individual venturi.

17. The air pollution control system of claim 16 further comprising at least one impingement surface positioned downstream of said venturi plate.

18. The air pollution control system of claim 11 wherein said at least one nozzle comprises means for flowing a mixture of a gas under pressure and a liquid through an orifice.

19. The air pollution control system of claim 18 further comprising means for independently adjusting the pressure of the gas in said mixture.

20. The air pollution control system of claim 18 further comprising means for independently adjusting the flow rate of the liquid in said mixture.

21. A method of scrubbing a flow of contaminated gas containing particles, comprising the steps of:

introducing said contaminated gas flow into the input end of a venturi scrubber, forming a spray of liquid droplets having a predetermined median diameter which is in the range of 10 to 200 microns and between 100 and 500 times larger than the median diameter of the optically active particles in said contaminated gas flow, and introducing said spray into the venturi scrubber at a velocity which is approximately the same as the velocity of the particles in said contaminated gas flow upstream of the throat of said scrubber, said spray comprising at least one gallon per minute per 1,000 actual cubic feet per minute of said gas.

22. The method of claim 21 wherein said liquid droplets are formed by forcing a mixture of said liquid and a gas through an orifice.

23. The method of claim 21 further comprising the step of precooling said contaminated gas flow prior to introducing it into said venturi scrubber.

24. The method of claim 23 further comprising the step of passing said gas flow through an afterburner stage downstream of said venturi scrubber, such that remaining combustible material in said gas flow is burned.

25. The method of claim 23 wherein said contaminated gas flow includes water vapor and wherein said precooling step comprises cooling the contaminated gas flow to a temperature at which substantial condensation of said water vapor occurs.

26. The method of claim 23 wherein said step of precooling said contaminated gas flow comprises the step of passing said contaminated gas flow through an impingement plate.

* * * * *

UNITED STATES PATENT AND TRADEMARK OFFICE
CERTIFICATE OF CORRECTION

PATENT NO.    : 5,279,646
DATED         : January 18, 1994
INVENTOR(S)   : Schwab, James J.

It is certified that error appears in the above-identified patent and that said Letters Patent is hereby corrected as shown below:

Column 9,
Line 40, delete "hp/acfm" and substitute therefor -- horsepower per 1000 acfm --.

Signed and Sealed this

Eleventh Day of June, 2002

*Attest:*

*Attesting Officer*

JAMES E. ROGAN
*Director of the United States Patent and Trademark Office*